(No Model.) 3 Sheets—Sheet 1.
J. & A. NAFZIGER.
GRAIN MEASURING MACHINE.
No. 298,612. Patented May 13, 1884.
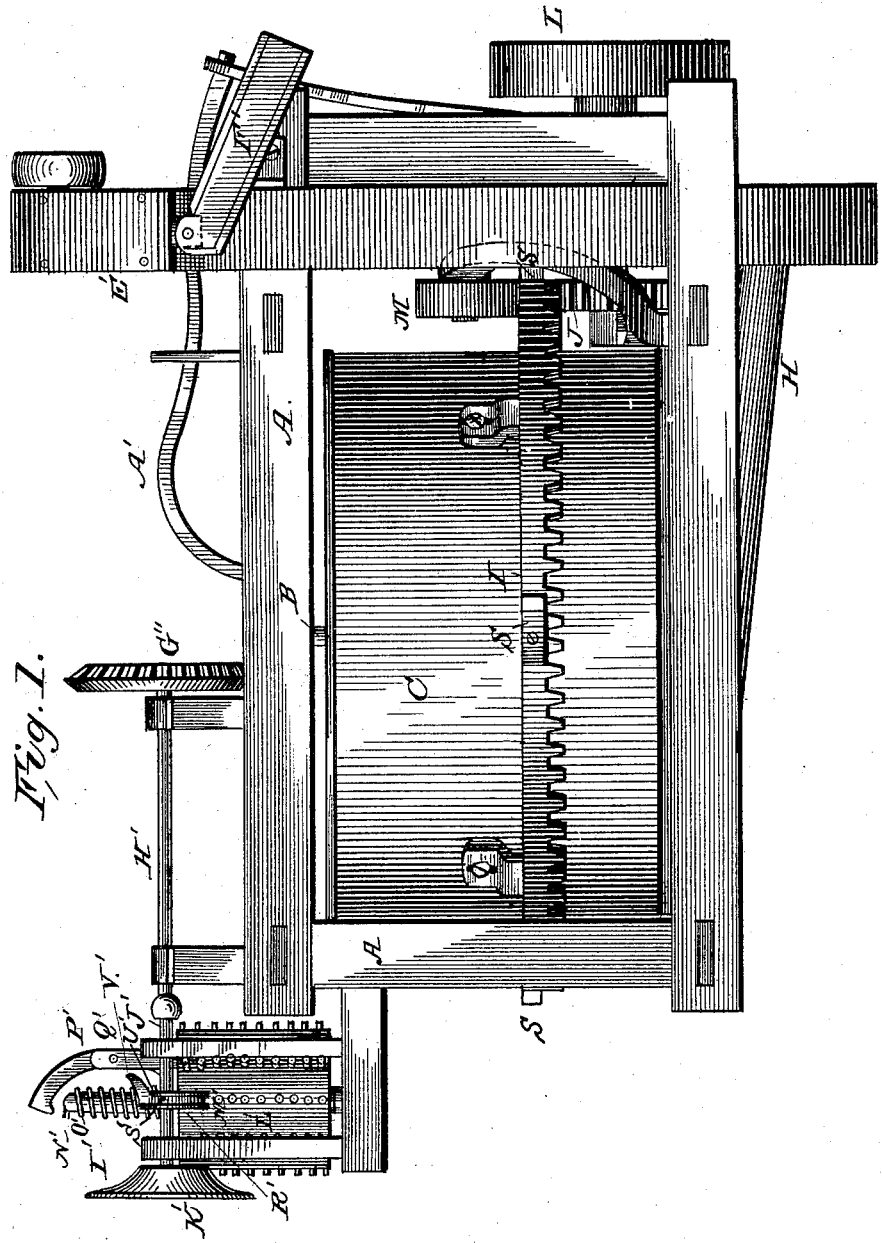
WITNESSES:
Fred. G. Dieterich
A. G. Lyne.
INVENTOR:
Joseph Nafziger
Andrew Nafziger
BY Munn & Co
ATTORNEYS.
N. PETERS, Photo-Lithographer, Washington, D. C.

(No Model.) 3 Sheets—Sheet 2.
J. & A. NAFZIGER.
GRAIN MEASURING MACHINE.
No. 298,612. Patented May 13, 1884.
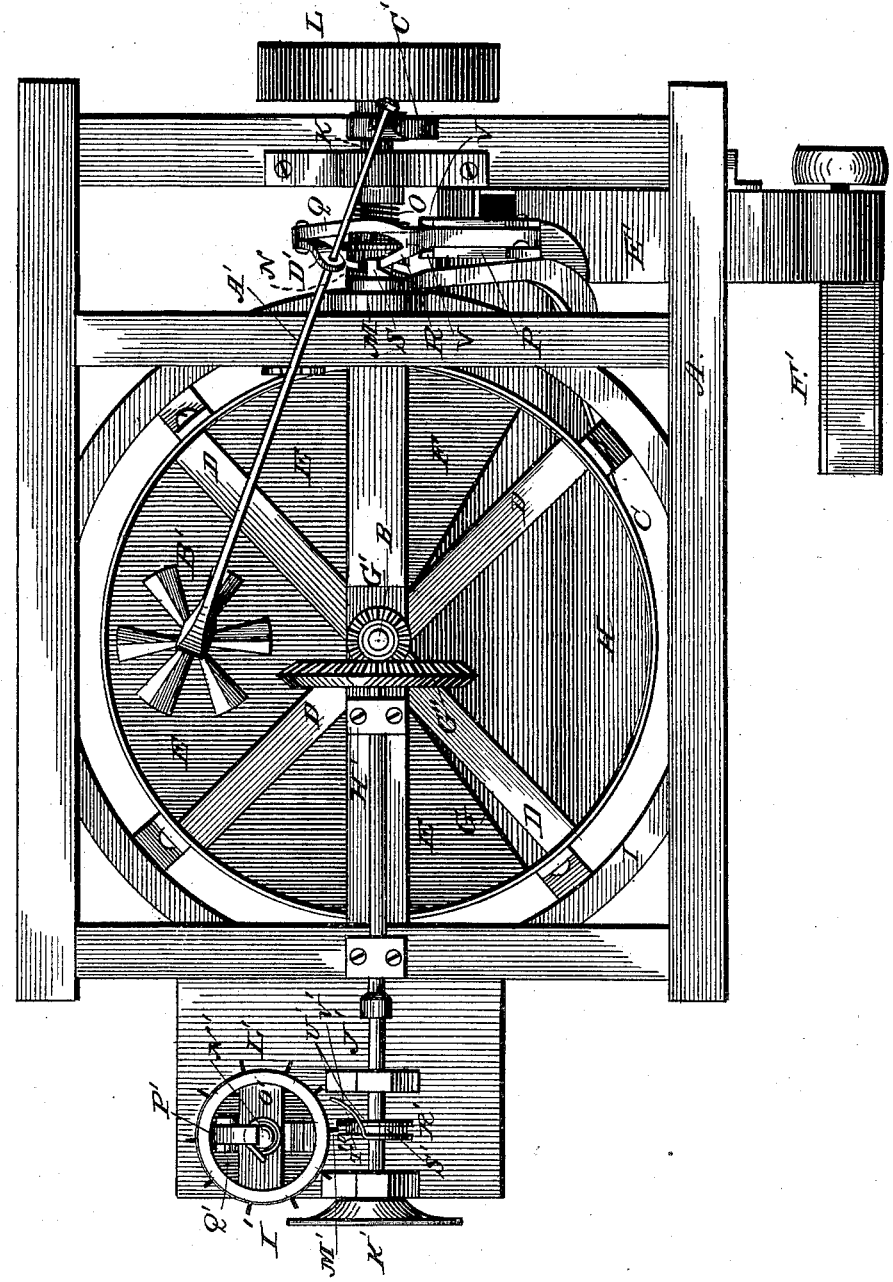

(No Model.) 3 Sheets—Sheet 3.
J. & A. NAFZIGER.
GRAIN MEASURING MACHINE.
No. 298,612. Patented May 13, 1884.
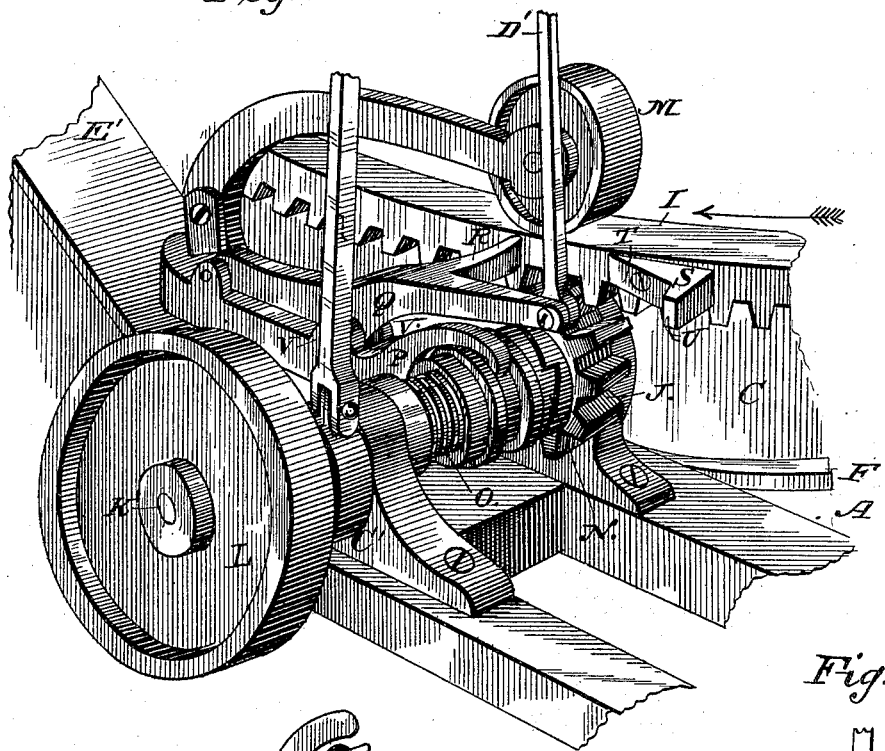
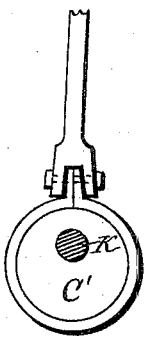
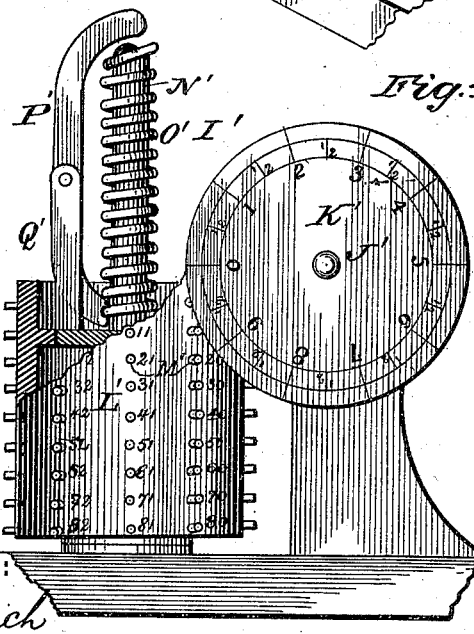
WITNESSES:
Fred. G. Dieterich
A. G. Lyne.
INVENTOR:
Joseph Nafziger
Andrew Nafziger
BY Munn &
ATTORNEYS.
N. PETERS. Photo-Lithographer, Washington, D. C.

UNITED STATES PATENT OFFICE.

JOSEPH NAFZIGER AND ANDREW NAFZIGER, OF HOPEDALE, ILLINOIS.

GRAIN-MEASURING MACHINE.

SPECIFICATION forming part of Letters Patent No. 298,612, dated May 13, 1884.

Application filed January 31, 1884. (No model.)

*To all whom it may concern:*

Be it known that we, JOSEPH NAFZIGER and ANDREW NAFZIGER, of Hopedale, in the county of Tazewell and State of Illinois, have invented a new and useful Improvement in Grain-Measuring Machines, of which the following is a full, clear, and exact description, reference being had to the annexed drawings, forming part of this specification.

This invention relates to measuring devices for grain, which are adapted to be attached to and operated from the separator of a thrashing-machine for automatically measuring the grain as it is thrashed; and the invention consists of the novel construction hereinafter described and claimed.

In the drawings, Figure 1 is a side elevation of our improved grain-measurer. Fig. 2 is a plan view of the same; and Figs. 3, 4, and 5 are detail views.

A indicates a supporting-frame, in which is journaled a vertical shaft, B, carrying an open-ended cylinder, C. The cylinder is provided with partitions D, forming four equal compartments, E, and it rests on a base-plate, F, which is cut away at G to form an opening leading to the chute H, by which the contents of each compartment E are successively discharged as the cylinder is intermittently rotated.

To the outer surface of the cylinder is bolted a toothed ring, I, which gears with a pinion, J, loosely mounted on a horizontal shaft, K, which is to receive a continuous motion from the separator of a thrashing-machine through the medium of a belt placed on the pulley L. A roller, M, supported above the ring I, serves to hold the latter in engagement with the pinion under all circumstances.

In order to give an intermittent movement to the cylinder, a clutch, N, is arranged on the shaft K, which is adapted to be pressed into engagement with a corresponding clutch on the pinion J by means of a spiral spring, O, arranged on the said shaft.

To the clutch-fork P is pivoted an arm, Q, having a catch, R, which is adapted to stop the motion of the cylinder at regular intervals by means of four lugs, S, secured to the periphery of the ring I at regular distances apart, and corresponding severally to the compartments E. The said lugs are formed with inclines T, leading to lips U, in order that the arm Q, which rests between lugs V on the clutch-fork P, shall be moved outward from the ring I, and thus throw the clutch N out of engagement with the pinion J before the catch R shall stop the ring I.

Above the cylinder is fulcrumed a lever, A', which is provided at one end with a grain-packer, B', consisting of a radially-slitted disk, which is adapted to press the grain down in the compartment E, which happens to be under it. The opposite end of the lever A' is connected by a rod to an eccentric, C', rigidly secured on the shaft K, whereby the lever is constantly oscillated to operate the packer.

In order that the complete filling with grain of any one of the compartments E shall be made to release the ring I and cause it to be moved to bring another compartment of the cylinder into position for being filled with grain, the lever A' is fulcrumed on the upper end of a rod, D', which is connected to the arm Q. With this construction, when the grain rises to the top of a compartment E, it will press the packer B' upward, and thus lift the arm Q by means of the rod D' until the catch R is drawn upward out of engagement with the lip U on the lug S, and also out of engagement with the incline T, whereupon the spring O will press the clutch N into engagement with the pinion J, and thus communicate the motion of shaft K to the ring I and cylinder C until the filled compartment is moved from under the packer, and the next lug S is brought into engagement with the catch R. The several parts are thus to be so arranged that each compartment shall in turn be stopped immediately under the packer, which will press down and smooth off the grain, and be itself acted upon by the grain, to cause the stop mechanism to release the cylinder and allow it to be set in motion. As the grain from each compartment E passes down the chute H, it is elevated through a grain-elevator, E', of the usual construction into a bin or other receptacle. (Not shown.) The upper end of this elevator is provided with a swiveled spout, F', which may be turned to any position according to the direction the grain is to be conveyed.

To register the number of discharges from the cylinder, the upper end of shaft B is provided with a bevel-pinion, G', which meshes with a large bevel-gear, G'', mounted on a horizontal shaft, H', to which is connected the register I'.

On the shaft J' of the register, which is a continuation of shaft H', is secured a dial-plate, K', having its face graduated and marked with numbers from 0 to 9, the intermediate spaces between the numbers being marked as halves. The value attached to these numbers will depend on the capacity of the compartment E and the arrangement of the gearing. Thus, if one revolution of the dial-plate K' is made by five revolutions of the cylinder, the number 10 or its equivalent on the dial-plate will represent twenty discharges from the cylinder; and if each of these twenty discharges represents a peck, 10 or its equivalent on the dial-plate will represent ten half bushels; or if each discharge is a half bushel, 10 or its equivalent on the dial-plate will represent ten bushels. A pointer for the dial-plate is formed by an externally-pegged drum, L', having the pegs M' arranged in spiral order around the same from top to bottom, and in vertical rows at equal distances apart. There are to be ten of these vertical rows of pegs and ten pegs to a row, and the pegs are to be numbered from 1 to 100, beginning at the top. The drum is supported on a vertical post, N', having a spiral thread, O', with which a dog, P', carried by the drum, engages, so that as the drum is rotated by means yet to be explained it will travel up the spiral thread. The dog P' is made in the form of a bent lever, pivoted near its center in standards Q, and the upper end of the lever extends over the upper end of the post N', so that when the lower end of the lever, which is notched to engage the thread, shall have traveled to the upper end of the thread, and thus slipped off the same, and allowed the drum to fall back to its first position by gravity, the upper end of the lever will strike on top of post N' and cause its lower end to engage the thread again automatically. The drum is rotated by means of a feed-screw, R', rigidly mounted on the shaft J', consisting of a wheel having a peripheral groove, S', the sides of which groove are cut away at T' and U', to form an inlet thereto and an outlet therefrom for the pegs, and provided with a curved flange, V', leading obliquely across the groove from U' and out to one side of the wheel, the said flange being equal in length to the distance between two rows of pegs on the drum. The groove S' is adapted to receive a peg, M', and to hold the drum thereby from rotation during one revolution of the feed-screw and dial-plate. When the feed-screw has nearly completed its revolution, and the flange V' is brought under the peg in the groove, and by its peculiar curve forces the peg from the groove through opening U', the drum will begin to rotate, and during the completion of the revolution of the feed-screw will move until the peg in engagement with the flange has allowed the same to pass out of contact therewith, and the next peg in regular order has been caught in the groove S' at the opening T'. As this operation is repeatedly performed, the drum ascends the post N', and the peg M', registering with the horizontal diameter of the dial-plate, will indicate the number of revolutions the dial-plate has made, and in addition thereto any fraction of a revolution it may have made. The value of a revolution of the dial-plate being predetermined, the value of the numbers on the drum may be quickly ascertained.

In order that the pegs may severally indicate the number of revolutions the dial-plate has made, when each registers with the horizontal diameter of the dial-plate, it is necessary that the three first pegs at the top of the drum, which correspond to the distance between the rim of the dial-plate and the feed-screw, shall not be numbered. The fourth peg from the top, therefore, counts one, and so on in regular order.

We do not broadly claim in this application an intermittently-rotating cylinder having partitions and open ends for measuring grain, having shown such in another application, allowed July 24, 1883, Serial No. 96,574.

What we claim is—

1. The combination, with the measuring-cylinder having a toothed ring secured around the same, and projections secured to the said ring at given distances apart, of the shaft having a loose pinion thereon gearing with said ring, the clutch on the said shaft adapted to engage the pinion, and the arm pivoted to the clutch-fork, and having a catch adapted to engage the lugs on the said ring, substantially as shown and described.

2. The combination of the toothed ring carrying the measuring-cylinder, and provided with lugs having inclines T and lips U, the shaft having the loose pinion gearing with the ring, the spring-actuated clutch feathered on said shaft and adapted to engage the pinion, the clutch-fork supporting the clutch, and the arm pivoted to the clutch-fork and arranged between lugs thereon, and having a catch adapted to be engaged by the lugs on the ring, whereby the clutch shall be thrown out of engagement with the pinion before the ring is stopped by the catch, substantially as specified.

3. The combination of the toothed ring carrying the measuring-cylinder, and provided with lugs having inclines T and lips U, the shaft having the loose pinion gearing with the ring, the spring-actuated clutch feathered on said shaft and adapted to engage the pinion, the clutch-fork supporting the clutch, the arm pivoted to the clutch-fork and arranged between lugs thereon, and having a catch adapted to be engaged by the lugs on the ring, the grain-packer and its supporting-lever, the eccentric and connecting rod for oscillating said lever, and the rod connecting the said pivoted arm with the said lever, substantially as shown and described, and for the purpose set forth.

4. The combination, with the measuring-cylinder, of the grain-packer consisting of a radially-slitted disk, (or equivalent device,) the lever carrying the said packer, and means for oscillating said lever, substantially as shown and described.

5. The combination of the oscillatory lever of the grain-packer, the clutch-fork, the oscillatory arm pivoted to said clutch-fork, and the rod connecting the said arm with the said lever, and serving as a fulcrum for said lever, substantially as shown and described, whereby the lifting of the lever by the contact of the grain with the packer shall lift the said arm, and thereby allow the clutch to act, as specified.

6. The combination, with the measuring-cylinder made open at both ends, and having the ring secured around the same, and adapted to rotate on a base, of the roller supported above the said ring and in contact therewith, substantially as shown and described.

7. The combination, with the measuring-cylinder and its vertical supporting-shaft, of the registering device, comprising the rotary dial-plate, the feed-screw, and the drum having pegs in its outer surface arranged in spiral order around the same and in vertical rows, substantially as shown and described.

8. The combination of the dial-plate having numbers marked thereon, the feed-screw mounted on the shaft of the dial-plate, and the pegged drum supported on a vertical post and connected to a thread on said post, and having the pegs arranged in spiral order and in vertical rows, and having numbers corresponding to the pegs, substantially as shown and described.

9. The combination of the drum, the post supporting the same and having a spiral thread thereon, and the dog supported in standards in the upper end of the drum, and having a notch in its lower end which engages said thread, and having its upper end extended over the upper end of said post, substantially as shown and described, whereby the fall of the drum when it runs off the upper end of the thread shall cause the dog to re-engage the thread, as set forth.

JOSEPH NAFZIGER.
ANDREW NAFZIGER.

Witnesses:
E. S. HOBART,
BENJAMIN EGLI.